J. K. WILLIAMS.
SAFETY DEVICE FOR MINE ELEVATORS.
APPLICATION FILED APR. 29, 1908.
927,440.
Patented July 6, 1909.
2 SHEETS—SHEET 2.
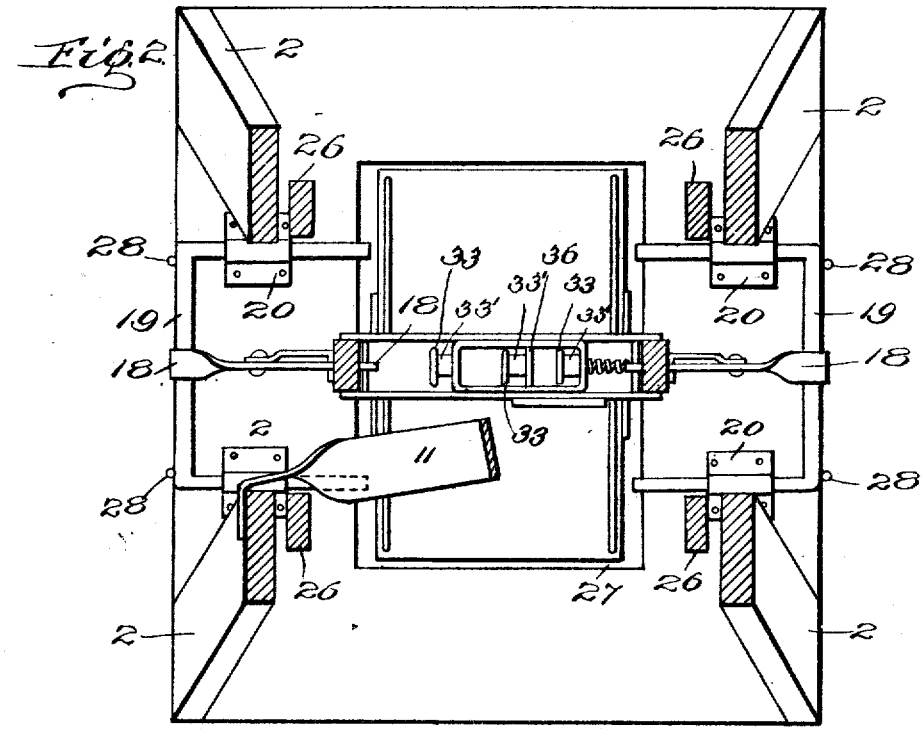
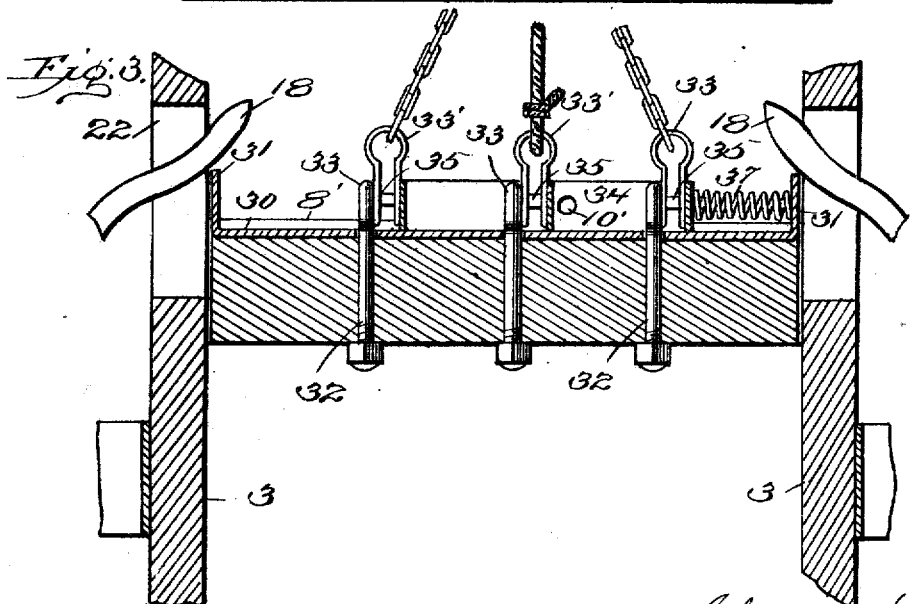

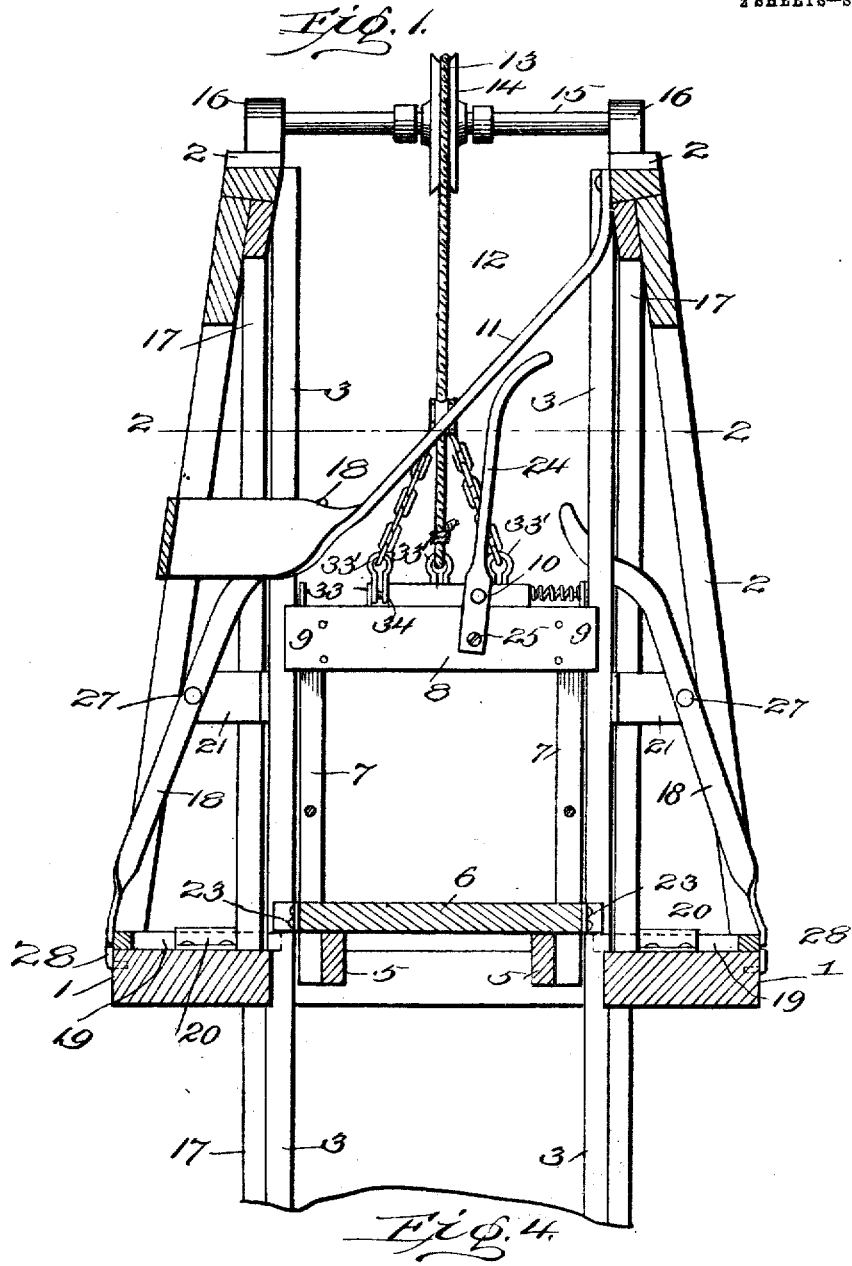

UNITED STATES PATENT OFFICE.

JOHN K. WILLIAMS, OF NANTICOKE, PENNSYLVANIA, ASSIGNOR OF ONE-HALF TO JOHN WASHCOFSKI, OF NANTICOKE, PENNSYLVANIA.

SAFETY DEVICE FOR MINE-ELEVATORS.

No. 927,440.   Specification of Letters Patent.   Patented July 6, 1909.

Application filed April 29, 1908. Serial No. 429,843.

*To all whom it may concern:*

Be it known that I, JOHN K. WILLIAMS, a citizen of the United States, residing at Nanticoke, in the county of Luzerne and State of Pennsylvania, have invented certain new and useful Improvements in Safety Devices for Mine-Elevators; and I do hereby declare the following to be a full, clear, and exact description of the invention, such as will enable others skilled in the art to which it appertains to make and use the same.

My invention relates to safety devices for mining elevators and the objects of my invention are to furnish a device that will prevent by automatic means a mining cage or elevator from being thrown over the sheave at the head of the shaft through the negligence or forgetfulness of the engineer in charge by operating an automatic means to detach the cable from the cage and other improvements which will be shown farther on in the specification. I secure these results by the mechanism shown in the accompanying drawing, in which, Figure 1 is an elevation. Fig. 2 a section on the line 2—2 of Fig. 1. Fig. 3 is a vertical section showing the eye-bolts and latch-attachments, and Fig. 4 is a plan of the latch.

Similar characters refer to similar parts throughout the several figures.

In the drawings, Fig. 1 shows the upper part of a mining shaft with its cage. 1 represents the landing of the shaft and 2 the converging uprights of its frame. 5 represents the sills of the cage of which 6 is the floor and 7 upright posts having a cross-bar 8 carrying guiding ends 9—9. 3—3 are guide-rails for the cage and 11 is a diagonally placed piece of flat iron whose object is to deflect the lever 24 for a purpose which will be hereinafter explained. Pivoted to brackets 21—21 on the uprights 3 by a pivot 27 are two levers 18—18, the upper ends of which are deflected and move in slots 22 in the uprights 3. The upper ends of the levers 18 protrude into the shaft in a way that will cause the rising cage to impinge upon them and operate them to force inwardly the U-shaped sills 19—19 which reciprocate in broad bearings 20—20 on either side of the shaft as best shown in Fig. 2. It is apparent that this device when the cage ascends and forces the ends of lever 18 outwardly, will automatically cause the U-shaped sills to move under the cage and thus prevent it from falling.

On the top of the cage, fastened to a cross-bar 8 by eye-bolts 32 is a hasp 30 having upwardly bent ends 31.

A latch-piece 36 illustrated in Fig. 4, and having longitudinally extended pintles 35 is placed on the hasp 30 in such a position that its pintles 35 may engage with the eyelets 33, and also with chain-links 33'. The latch is kept in engagement with the eyelets, and the chains by the pressure of a spring 37 impinging against a turned-up portion 31 of the hasp.

In some mining regions, as in Pennsylvania, the law requires plural chain fastening and Fig. 3 represents plural chains fixed to a car or cage with my device.

The operation of my device is as follows:— As the cage ascends in the shaft the lever 24 comes in contact with the diagonal bar 11 and is bent outward and pivoting on the screw 25 engages the latch by means of a loose bolt 10 in the hole 10' in the latch. As the latch moves laterally the pintles will move outward from the chain-links 33', and the chain is disengaged. The cage would descend were it not that the automatic appliances for passing the sills thereunder have already acted, which serves to firmly support the cage.

It is not necessary that the levers should be attached to the guides, but they may be otherwise attached, the important feature being that they should be operated by the rising cage and should move the sills thereunder.

The cage, of course, may be equipped with the ordinary safety appliances intended to check the fall of the carriage, and my device is an additional preventive means.

What I claim is:—

1. In a cable detaching device for elevator cars, a reciprocating device carrying a series of pintles, eye bolts adapted to be carried by the car, and means arranged to be connected with the cable provided with apertures adapted to register with the eye bolts, said pintles engaging said apertures and eye bolts.

2. In a cable detaching device for elevator cars, a reciprocating device carrying a series of pintles, a spring for operating said device, eye bolts adapted to be carried by the car, and means arranged to be connected with the cable provided with apertures adapted to register with the eye bolts, said pintles engaging said apertures and eye bolts.

3. In a cable detaching device for elevator cars, a longitudinally reciprocating frame carrying pintles, eye bolts adapted to be carried by the car, and means arranged to be connected with the cable and provided with apertures adapted to register with the eye bolts, said pintles engaging such apertures and eye bolts.

4. In a cable detaching device for elevator cars, guiding devices carried by the car, a longitudinally movable frame operating between the guides and carrying pintles, said pintles projecting in the direction of movement of the frame, a spring bearing against said frame, eye bolts adapted to be carried by the car, U-shaped devices provided with apertures arranged to be connected with the cable, said apertures registering with the eye bolts, and an operating lever pivoted to the car and to the movable frame.

In testimony whereof I affix my signature in presence of two witnesses.

JOHN K. WILLIAMS.

Witnesses:
  JOHN WASHCOFSKI,
  W. J. TREMBATH.